UNITED STATES PATENT OFFICE.

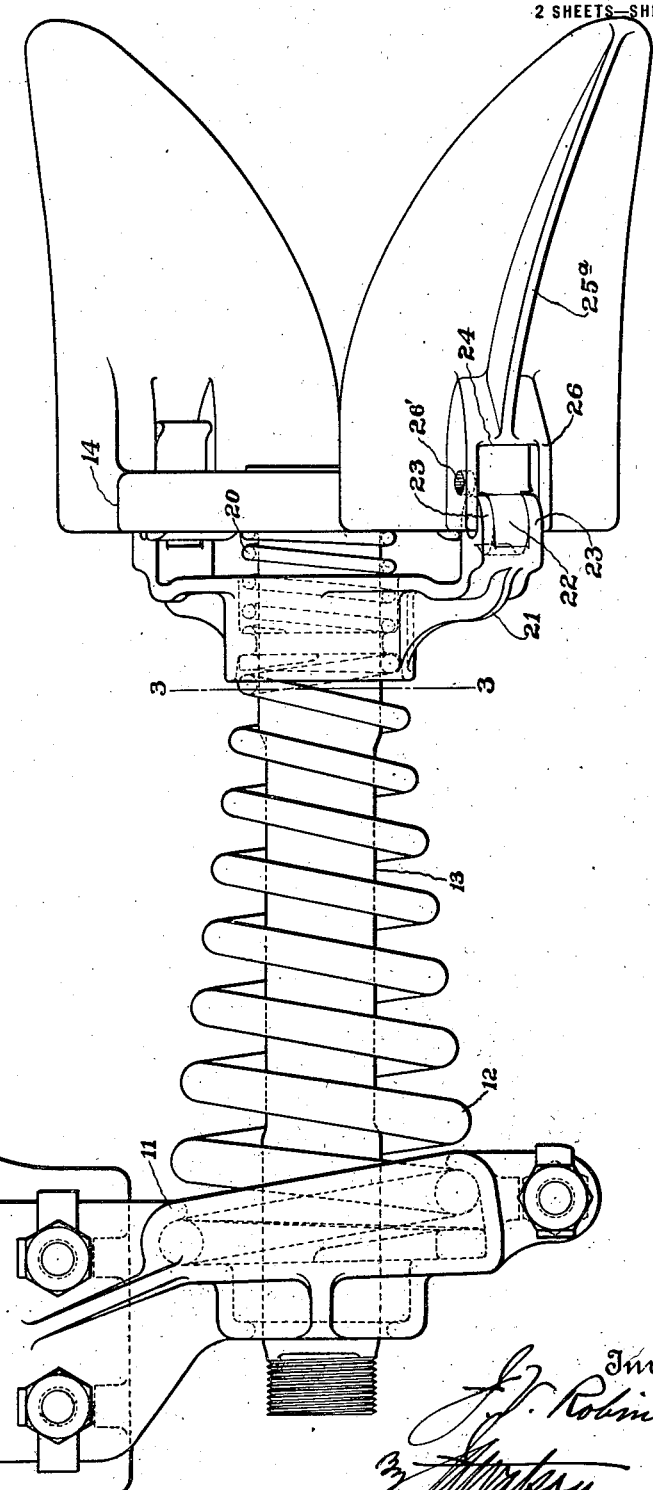

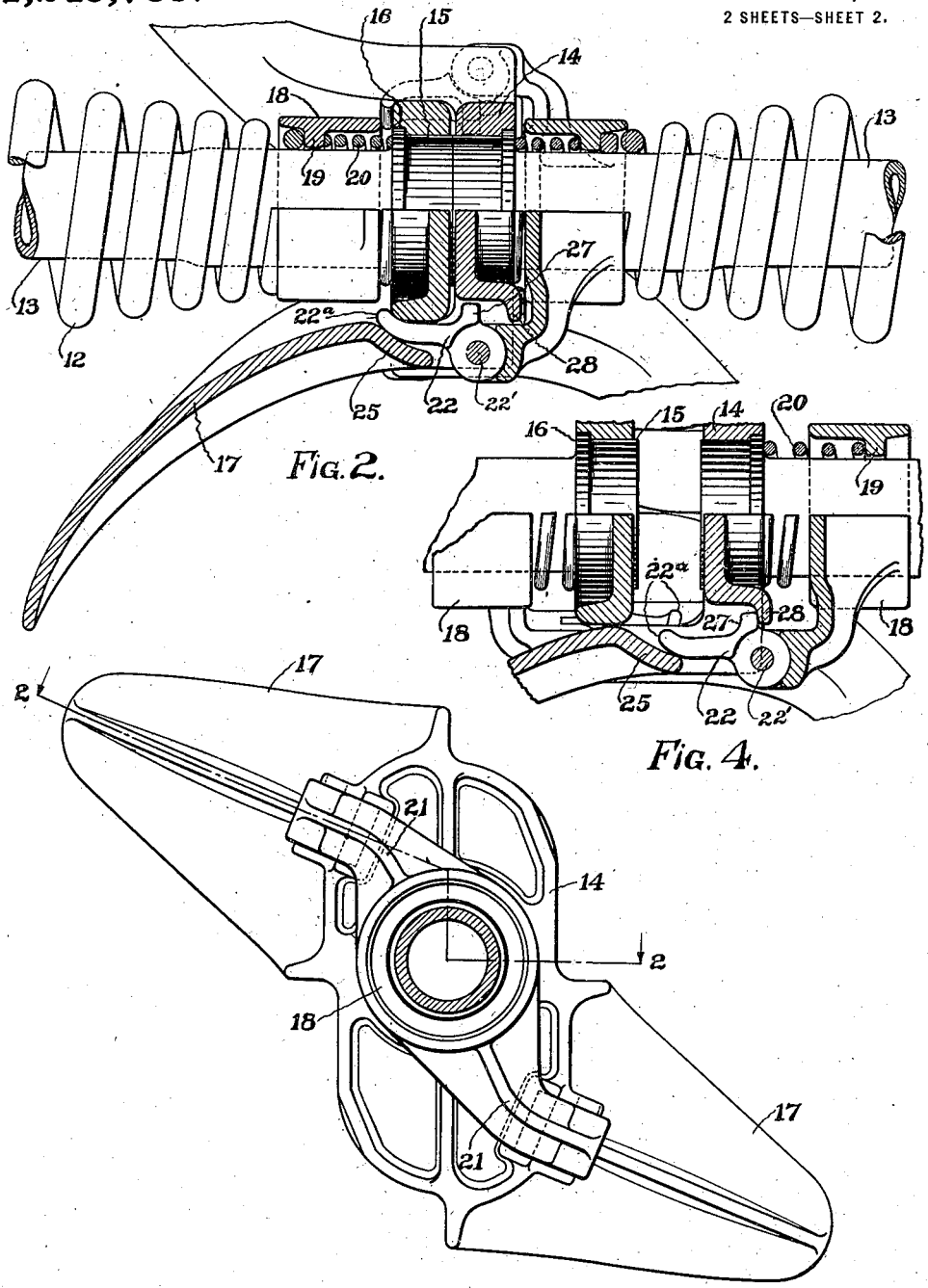

JOSEPH V. ROBINSON, OF BRANFORD, CONNECTICUT.

AUTOMATIC TRAIN-PIPE CONNECTOR.

1,245,783.  Specification of Letters Patent.  Patented Nov. 6, 1917.

Application filed June 13, 1913, Serial No. 773,560. Renewed September 13, 1917. Serial No. 191,307.

*To all whom it may concern:*

Be it known that I, JOSEPH V. ROBINSON, a citizen of the United States, residing at Branford, in the county of New Haven, State of Connecticut, have invented certain new and useful Improvements in Automatic Train-Pipe Connectors, of which the following is a specification.

This invention relates to that type of automatic couplers which are used for coupling train pipes. The object of the present invention is to provide means for locking the two members constituting the coupling together automatically and positively, with a view to holding the meeting faces of the coupling in rigid contact and preventing partial separation and consequent leakage in rounding curves or under other conditions of service. More particularly the invention consists in providing a sliding collar or support on the tubular stem of the coupling member in rear of the coupler head, and pivoted dogs on the collar or support, the dogs being adapted to engage an opposing coupling member when the collar is moved forward, and in providing means for properly operating the collar and dogs in coupling and uncoupling cars. The preferred embodiment of the invention will be described in connection with the accompanying drawing in which—

Figure 1 is a side elevation of one member of an automatic coupling embodying my invention.

Fig. 2 is a section taken on the line 2—2 of Fig. 3 illustrating a complete coupling, the two members being locked in coupled relation.

Fig. 3 is a section about on the line 3—3 of Fig. 1; and

Fig. 4 is a section similar to a part of Fig. 2 but showing the coupling members in the position which they occupy at the moment of first contact.

Referring to the drawing, 10 indicates a bracket which is fixed on the drawhead or other permanent part of a car, 11 the base which supports the train pipe coupling, 12 a tapering spring, the rear end of which is securely locked in the base and the forward end of which encircles and supports a tube or pipe 13, the rear end of the pipe 13 passing freely through an opening in the base. The parts 10 to 13 inclusive are of a construction heretofore used by me and shown in prior applications. In so far as the present invention is concerned they may be varied and it is therefore not necessary to describe them further in detail.

On the forward end of the tube member 13 is rigidly secured a coupler head 14. As shown in Fig. 2 the forward end of the tube 13 is slightly enlarged as at 15 and provided with a shoulder 16, and the enlargement 15 is pressed or driven tightly into the opening in the head 14. Each coupler head 14 has cast integral therewith two guide wings 17, the wings of one coupling member being adapted to pass between the wings of an opposing member and to guide the opposing coupling heads into exact register with each other in a manner well known in the art.

Each member of the coupler is provided with a locking device comprising a collar 18 which surrounds the tube 13 in the rear of the head 15. The collar is provided with an annular shoulder 19, which fits loosely about the tube 13 to permit angular movement of the arm 21 of the locking device relative to the coupling head and tube, whereby each of the locking dogs 22 may be forced forwardly on the head 14 by the spring 12 independent of movement of the other of them, to take up any wear on the dogs, the housings 25 and the coupling head 14, and to equalize the relative clamping effect of the dogs 22 upon the companion coupling head. The forward end of the spring 12 fits in an annular recess in the collar and abuts against the shoulder 19 thus tending to press the collar toward the coupler head when the members are in coupled relation, and locking the heads together and adjusting the dogs 22 to equalize the locking effect thereof and take up wear on the heads 14 as above described. Within the collar 18 and forward of the shoulder 19 is another annular recess containing a spring 20 which is weaker than the spring 12 and yields to some extent before the spring 12 begins to yield in the act of coupling. Each collar 18 has two substantially radial arms 21 in rear of and extending in the same general direction as the middle lines of the wing guides 17. In the outer ends of the arms 21, locking dogs 22 are mounted in pivotal bearings, the said dogs extending through openings in the wings 17 so as to be adapted to engage with and lock an opposing coupling head when the coupling members are brought together, as will be presently described. In the preferred form of the invention the arms 21 each have two ears 23, as clearly shown in Fig. 1, and the dogs 22 are pivoted between them. Each wing is provided with an opening 24 through which the dog extends and the opening is partially closed by a housing a portion 25 of which serves as a cam to force the dog inward into locking position when the coupler members are brought tightly together as shown in Fig. 2. The wings are preferably ribbed to give them strength and lightness and each rib 25ᵃ is bifurcated at the base of the wing, the branches 26 forming the sides of the housing for the dog 22 and being provided with an opening 26′ to facilitate the insertion of the pin 22′ in the ears 23 and the dogs 22. Each dog is provided with an arm 27 which engages the shoulder 28 on the head of the coupler to throw the dog outward into its inoperative position when the couplers separate, as shown in Fig. 4. It will be understood that each coupling member carries two diametrically opposite dogs 22 and that hence two mating coupling heads are securely held together by four dogs when provided with my present invention.

The operation of coupling and locking is as follows: It will be understood that the coupling heads are flexibly or yieldingly sustained in position to engage each other by the springs 12. In uncoupled position the collars 18 are forced to the rear into the position shown in Fig. 1 by the short springs 20 which are interposed between the collars and the coupling heads. The normal position of the locking dogs with respect to the guide wings is shown in Fig. 4. When two mating coupling members come together the faces contact and mutually press each other backward toward the bases 11 which sustain the couplers, the tubes 13 sliding through the bases. In this backward movement the springs 20 yield first, causing the collars 18 to move relatively toward the coupling heads. This movement of the collars causes the forward ends of the dogs 22 to be cammed inward by the inner surfaces of the members 25 of the housings for said dogs, such inner faces operating to receive the strains of service caused by the tendency of coupling heads 14 to rock relatively and in this manner said surfaces free the pivotal bearings of the dogs 22 of such strains of service. The engaging portions or free ends of the dogs are curved inward as shown at 22ᵃ and they pass partially around the outer rear edge of the opposing head and tend to crowd the faces of the opposing heads together. As two adjacent cars become coupled the springs 12 of their respective train pipe couplings are considerably compressed and this pressure is transmitted to the collars 18 and forces the dogs 22 into engagement with the opposing heads and holds them there until the cars are uncoupled. As the cars are uncoupled the various coupling movements take place in their reverse order and in reverse direction. The springs 12 expand to their full length first and later the springs 20 expand and move the collars 18 rearward withdrawing the locking dogs from engagement with the opposing coupler heads. In the drawing I have shown the coupler sustaining springs as formed of a tapered bar and the spring as having a general tapering form, but it will be understood that my invention will operate with other well known forms of springs. It will be noted that the operation of the locking dogs is positive and that they serve to hold the coupling heads securely together, thus preventing leakage. It will further be noted that the construction of the dogs and their operating devices is simple and comparatively inexpensive, and that these locking devices are light and take up no room other than that necessary for couplings unprovided with these devices.

Having thus described the invention, what I claim and desire to secure by Letters Patent, is:

1. In an automatic train pipe connector, the combination with a coupling head having a flat transverse coupling face, of a pivotally mounted latch extending through an opening in the head and adapted to engage a companion head when the coupling faces of the two heads are in contact, and means on the head through which the latch extends for rocking the latter on its pivot as the two heads come into coupling relation.

2. In an automatic train pipe connector, the combination with a coupling head having a guide provided with an opening, of a member operating in said opening, and means on said guide for shifting said member into engagement with a companion coupling head to firmly lock mating heads together.

3. In an automatic train pipe connector, the combination with a coupling head adapted to connect with a companion head, of means carried with the coupling head for locking the latter to said companion head, said means comprising a plurality of levers each adapted to be shifted axially in the coupled position by the lineal movement of said coupling head independent of axial shifting of the other of said levers.

4. In an automatic train pipe connector, the combination with a coupling head adapted to connect with a companion head, of means for locking the two heads together, said means comprising a pair of levers carried by said coupling head for engaging said companion head, and means for equalizing the relative clamping pressure of said levers upon said companion head under all conditions of service.

5. In an automatic train pipe connector, the combination with a coupling head adapted to connect with a companion head, of means for locking the two heads together, said means comprising a lever mounted in a pivotal bearing, and means for freeing said bearing of the strains of service caused by the tendency of said heads to shift relatively in the coupled position.

6. In an automatic train pipe connector, the combination with a coupling head adapted to connect with a companion head, of a spring for extending the head, a conduit extending rearwardly of the head through said spring, and a locking device between the head and the spring and carrying radially extending arms and levers that are adapted to be forced into engagement with said companion head when the connector couples up in service.

7. In an automatic train pipe connector, the combination with a coupling head adapted to connect with a companion head, of a spring for extending the head, a conduit extending rearwardly of the head through said spring, a locking device carrying locking levers, said locking device being operated upon by said spring to hold said levers in position to be engaged with a companion head when said heads come into coupling relation, and a spring operating against the front face of said locking device to force said levers to inoperative position when the coupling heads separate in service.

8. In an automatic train pipe connector, the combination with a coupling head adapted to connect with a companion head, of a spring for extending the head, a locking device between said spring and head and adapted to assume angular positions relative to the coupling head, and a lever carried by said device and operated upon by said coupling head to lock the latter to said companion head in service.

9. An automatic train pipe connector member comprising in combination a tubular stem, a head, guide wings on said head, a support slidable on said stem, and locking dogs on said support and extending through openings in said wings, the inner surfaces of said openings forming cams to operate said dogs, for the purpose set forth.

10. In an automatic train pipe connector, the combination with a coupling head adapted to connect with a companion head and having a flat transverse coupling face and a forwardly extending guiding prong, of a lever arranged to operate through an opening in said prong to engage a companion head in service, a stem connected with the coupling head and extending rearwardly therefrom, a member connected with said lever and related to the stem so that one embraces the other, a spring for extending the coupling head and placing it under pressure, and a second spring for moving said member and lever to inoperative position.

In testimony whereof I affix my signature in presence of two witnesses.

JOSEPH V. ROBINSON.

Witnesses:
   EARLE A. BARKER,
   J. A. WATSON.